United States Patent
Roba et al.

(10) Patent No.: US 9,563,865 B2
(45) Date of Patent: Feb. 7, 2017

(54) MULTIPLE-LEVEL TREATMENT FOR OPTIMIZING ONE OR MORE FLUID SEPARATION UNITS

(75) Inventors: Thierry Roba, Houston, TX (US); Gaetan Guillet, Houston, TX (US); Athanasios J. Kontopoulos, Houston, TX (US)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 202 days.

(21) Appl. No.: 13/813,194

(22) PCT Filed: Jul. 25, 2011

(86) PCT No.: PCT/EP2011/062762
§ 371 (c)(1),
(2), (4) Date: Jan. 30, 2013

(87) PCT Pub. No.: WO2012/019905
PCT Pub. Date: Feb. 16, 2012

(65) Prior Publication Data
US 2013/0197962 A1    Aug. 1, 2013

(30) Foreign Application Priority Data
Aug. 10, 2010 (FR) ..................... 10 56530

(51) Int. Cl.
*G06Q 10/00* (2012.01)
*G06Q 10/06* (2012.01)
(Continued)

(52) U.S. Cl.
CPC ......... *G06Q 10/06312* (2013.01); *G05B 11/32* (2013.01); *G05B 13/026* (2013.01)

(58) Field of Classification Search
CPC .. G05B 11/32; G05B 13/026; G06Q 10/06312
(Continued)

(56) References Cited

U.S. PATENT DOCUMENTS

| 2,320,492 A | * | 6/1943 | Walker .................... E21B 47/06 73/152.31 |
| 5,315,521 A | * | 5/1994 | Hanson ................ B01J 19/0033 700/103 |

(Continued)

OTHER PUBLICATIONS

FR1056530, French Search Report, May 3, 2011.
PCT/EP2011/062762, International Search Report and Written Opinion, Oct. 24, 2011.

*Primary Examiner* — Alan S Miller
*Assistant Examiner* — Folashade Anderson
(74) *Attorney, Agent, or Firm* — Justin K. Murray

(57) ABSTRACT

The invention relates to the optimized management of one or more fluid production units, especially those involving fluid separation treatment, comprising: a) a data collection step, the data being on one or more values of current parameters defining a current operating point of the production unit, on a future production demand and on at least one optimization criterion; and b) a computation step for computing one or more parameters defining a new operating point of the unit, at least in accordance with this demand. The computation step b) comprises at least: 1) an estimation of at least one optimum solution for defining the new operating point; and 2) a validity test carried out on this optimum solution, at least in accordance with an analysis of the transition of the production unit from the current operating point to the new operating point.

13 Claims, 4 Drawing Sheets

(51) Int. Cl.
*G05B 11/32* (2006.01)
*G05B 13/02* (2006.01)

(58) Field of Classification Search
USPC .......................................... 705/7.25
See application file for complete search history.

(56) References Cited

U.S. PATENT DOCUMENTS

| | | | |
|---|---|---|---|
| 7,092,893 B2 * | 8/2006 | Megan et al. ............... | 705/7.31 |
| 7,643,974 B2 * | 1/2010 | Harper ..................... | F17D 3/00 |
| | | | 406/12 |
| 7,734,491 B2 * | 6/2010 | Kayahara et al. ........... | 705/7.23 |
| 7,953,584 B2 * | 5/2011 | Rashid ............................ | 703/10 |
| 8,065,243 B2 * | 11/2011 | Harper .................... | G06N 7/06 |
| | | | 706/13 |
| 2003/0018503 A1 * | 1/2003 | Shulman .......................... | 705/7 |
| 2003/0233262 A1 * | 12/2003 | Chorely et al. ................... | 705/8 |
| 2009/0291926 A1 * | 11/2009 | Christgau et al. ........... | 514/165 |
| 2010/0042458 A1 * | 2/2010 | Rashid et al. .................... | 705/8 |
| 2013/0231787 A1 * | 9/2013 | Chapman et al. ............ | 700/282 |

* cited by examiner

FIGURE 2

HORTATOR PROGRAM

| | Network Setpoints | | | | | | | |
|---|---|---|---|---|---|---|---|---|
| | Monday | Tuesday | Wednesday | Thursday | Friday | Saturday | Sunday | Active |
| CYCLE | | | | | | | | |
| HC | yes | yes | yes | yes | yes | yes | yes | yes |
| HP | no | no | no | no | no | yes | yes | no |
| OFF if B50> | 5800 ml | 5800 ml | 5800 ml | 5800 ml | 5800 ml | 5800 ml | 5800 ml | 5800 ml |
| ON if B50< | 5500 ml | 5500 ml | 5500 ml | 2100 ml | 5500 ml | 4700 ml | 5300 ml | 5500 ml |
| Minimum | 500 hm | 600 hm | 600 hm | 2100 hm | 600 hm | 500 hm | 600 hm | 600 hm |
| NG Network | | | | | | | | |
| Hour 1 | 700 hm | 700 hm | 700 hm | 700 hm | 700 hm | 700 hm | 700 hm | 700 hm |
| Pressure | 45.0 b | 45.0 b | 45.0 b | 45.0 b | 45.0 b | 45.0 b | 45.0 b | 45.0 b |
| Hour 2 | 2200 hm | 2200 hm | 2200 hm | 1900 hm | 2200 hm | 2200 hm | 2200 hm | 2200 hm |
| Pressure | 45.0 b | 45.0 b | 45.0 b | 45.0 b | 45.0 b | 45.0 b | 45.0 b | 45.0 b |
| Max. pres. | yes | yes | yes | yes | yes | yes | yes | yes |
| OG Network | | | | | | | | |
| Hour 1 | 700 hm | 700 hm | 700 hm | 700 hm | 700 hm | 1200 hm | 700 hm | 700 hm |
| Pressure | 45.0 b | 46.0 b | 46.0 b | 55.0 b | 55.0 b | 55.0 b | 55.0 b | 45.0 b |
| Hour 2 | 2200 hm | 2200 hm | 2200 hm | 2300 hm | 1700 hm | 2200 hm | 2200 hm | 2200 hm |
| Pressure | 45.0 b | 46.0 b | 46.0 b | 55.0 b | 55.0 b | 55.0 b | 55.0 b | 45.0 b |
| Max. pres. | yes | yes | yes | yes | yes | yes | yes | yes |
| Priority on limit | OG | OG | OG | OG | OG | OG | OG | OG |
| BiB required | | | | | | | | |
| If B40< | 2800 ml | 2100 ml | 2300 ml | 2300 ml | 2400 ml | 2500 ml | 2800 ml | 2800 ml |
| Offset | -1500 m3 | -3500 m3 | -3500 m3 | -3500 m3 | -3500 m3 | -3500 m3 | -1500 m3 | -3500 m3 |
| If B50< | 2999 ml | 4000 ml | 5000 ml | 6000 ml | 6000 ml | 500 ml | 400 ml | 2999 ml |
| Offset | 2000 m3 | 2000 m3 | 2000 m3 | 2000 m3 | 2000 m3 | 2000 m3 | 2000 m3 | 2000 m3 |
| B50 prior | no | yes | no | yes | yes | no | no | no |
| Swap Prior | yes | no | no | no | no | no | yes | yes |

COCKERILL FRAME  
OG pressure 64B  
NG pressure 64B  
B50 3041.6 m3

29/03/2007  
SPT 45.81 b  
SPT 44.78 b  
B40 2029.5 m3

14 h 10 m 50s  
REAL 51.08 b  
REAL 44.76 b  
BUSY HOUR

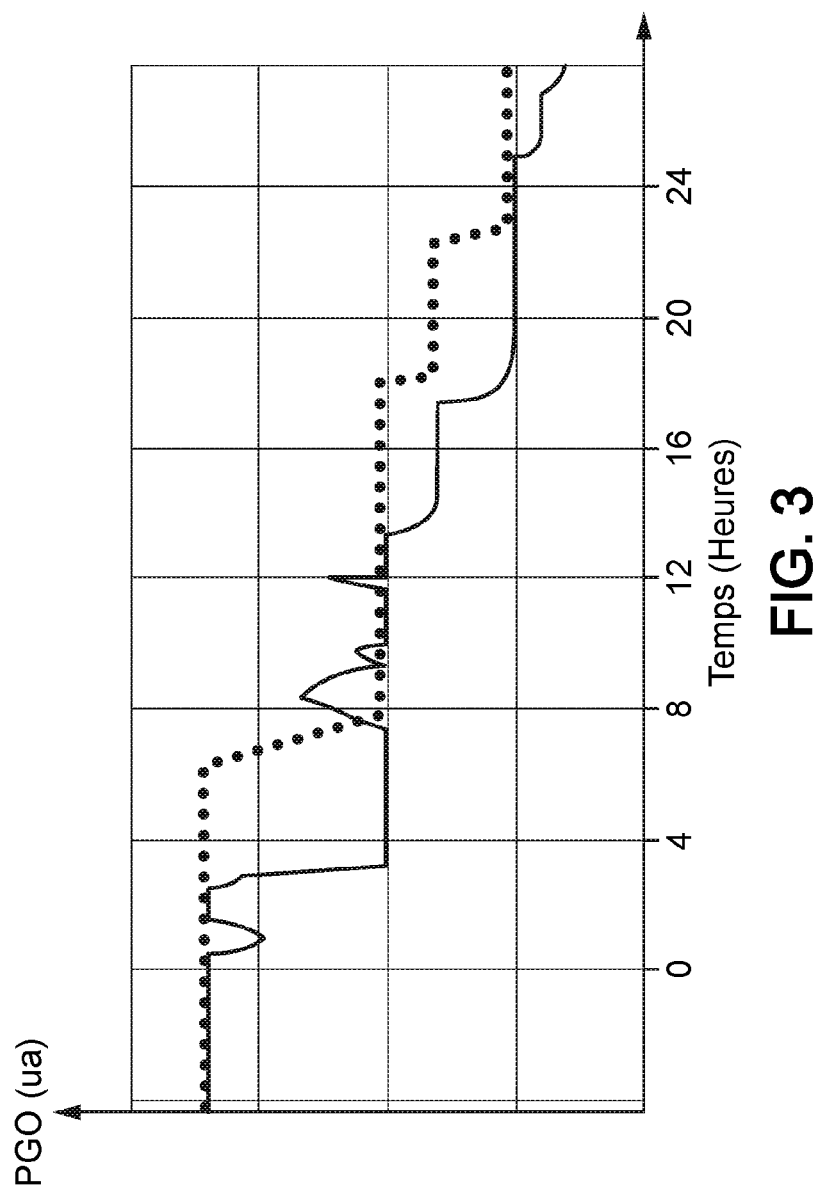

MULTIPLE-LEVEL TREATMENT FOR OPTIMIZING ONE OR MORE FLUID SEPARATION UNITS

CROSS REFERENCE TO RELATED APPLICATIONS

This application is a §371 of International PCT Application PCT/EP2011/062762, filed Jul. 25, 2011, which claims the benefit of FR1056530, filed Aug. 10, 2010, both of which are herein incorporated by reference in their entireties.

TECHNICAL FIELD OF THE INVENTION

The present invention relates to a processing of parameter data obtained from at least one fluid production unit, notably but not exclusively in the field of air gas production. Other applications can be provided, such as, for example, the production and separation of hydrogen and carbon monoxide, and more generally any operation (or set of operations) of a production unit (or "unit operations") with optimization objectives and multiple constraints in the separation of at least two initially mixed fluids, or even more generally in the co-production of fluids.

BACKGROUND

Hereinbelow, the principle of a unit for separating fluids, such as air gases, is not described in detail, it being a principle widely described in the literature.

All that is indicated here is that this method, for example for separating the constituents of air, is used to produce oxygen, nitrogen and argon (more rarely krypton and xenon):

in gaseous form, or
in liquid form.

The gases produced (for example oxygen and nitrogen) are generally compressed at different pressure levels and sent to one or more final consumption points. These points may be local or remote. In the case of remote consumption points, the fluids pass through a distribution network (via pipelines for example).

The liquids produced (for example oxygen, nitrogen, argon, krypton or xenon) are, for their part, stored in cryogenic tanks then transported by trucks or wagons to the final consumption points.

The difficulty in managing such a unit stems notably from the fact that all the productions of these fluids are interlinked and the increase in quantity of one or more product leads inevitably:

to the reduction of one or more other products, if it concerns, for example, a consideration of gaseous phase in relation to a liquid phase of one and the same species, or to their increase, if it concerns, for example, a consideration of one species relative to others (for example oxygen relative to nitrogen, argon, krypton or xenon).

Furthermore, the means used for the compression or liquefaction, on a production site (which may comprise a plurality of production units), are multiple. It is therefore best to optimize the use of these means in order to both satisfy the production constraints and minimize the energy consumed for the production. In practice, as an indication, 60% of the costs of production of air gases are generally linked to the consumption in particular of electricity.

The choice of the operating parameters (air charge, liquid production, choice of compression means, and other) is generally entrusted to operators (physical individuals). In some cases, automatic systems drive the production unit (or set of units) by using sophisticated control tools which typically handle the management of a transitional state from a first unit operating point A to a second operating point B.

Different types of control tools are known for managing the production load variations of a production unit. These tools generally use predictive control of the type:

with multi-variable predictive control, "MVPC", or even, for example, with advanced predictive control, or advanced feed-forward (AFF) control strategy.

The tools of the first type (MVPC) generally make it possible to achieve a high degree of optimization because they can drive the system at a point close to its limits (property known as "constraint pushing"). This type of technique may have an optimizer, more often than not linear, associated with it.

One the main gaps to be overcome generally, for these types of tool, is an integration of the problem of optimization (which answers the question: "where do we go?") and the problem of control (which answers the question: "how do we get there?"). This integration may provoke certain useless oscillations through the feedback, in particular in a transitional phase.

Moreover, this type of control presents a difficulty, even an impossibility, in using logic variables (stopping or starting equipment for example).

This type of control takes no account of any notion of time in the production objectives, but simply defines setpoints to be reached as quickly as possible.

Only the constraints that have a linear (or pseudo-linear) relationship with one or more degrees of freedom (defined by control variables) can be managed appropriately. For example, the releasing of a product into the air (due to a difference between consumption and instantaneous production) is difficult to control by this type of system because the gain (in the dynamic sense) is cancelled suddenly when the corresponding valve is closed.

Such a control, even though it is well suited to performing changes of load (management of the production dynamics), is not truly suitable for determining an operating point that optimizes the use of the energy of the site.

There has been proposed an adaptation of this type of optimizer according to a static form that makes it possible, for example, to manage the liquid production of units connected to a network (document U.S. Pat. No. 7,092,893). This optimizer defines objectives, or targets, with a load change controller (MVPC type). Provision is made in particular to use a predefined time interval (more specifically, a fixed period) to send targets to the controller.

However, such an implementation risks provoking oscillations, or even non-optimal results (typically, a static optimization in a method in a non-stationary state). Moreover, the feedback, in this type of configuration, can be taken into account only with difficulty, and therefore with a risk of offset between the model and the real state of the production unit. Furthermore, it would appear that this type of optimization can be executed only with a very slow and fixed rate.

The present invention improves the situation.

SUMMARY OF THE INVENTION

To this end, it proposes a method implemented by computer means, for optimizing the management of one or more units producing at least one fluid by co-production of fluids (notably by fluid separation treatment). The method comprises:

a) a step of collection of data:
   one or more current parameter values defining a current operating point of the production unit,
   a future production demand, and
   at least one optimization criterion,
b) and a step of computing one or more parameters defining a new operating point of the unit, at least according to said demand.

Within the meaning of the invention, the computation step b) comprises in particular:
   b1) an estimation of at least one optimum solution for the definition of the new operating point, and
   b2) a test of validity of said optimum solution, at least according to an analysis of transition of the production unit from the current operating point to the new operating point.

The production unit may be an apparatus for separating air by cryogenic distillation or an apparatus for separating a mixture of carbon monoxide and hydrogen by cryogenic distillation or an apparatus for enriching the carbon dioxide content of a flow containing carbon dioxide by distillation.

Thus, the invention allows for an optimization at two levels: following a setting of optimum targets on a first level, an optimization of the transitional passage to reach this state is proposed in the operation b2). The invention then proposes a two-level optimization by answering the two questions:
   what is the overall target to be reached? and
   how do we reach this target (or what "path" must be taken to reach this target)?

For example, if the new operating point determined in the operation b1) is too close to a current operating point of the production unit, reaching this new operating point however requiring a sub-optimal operating transition (risking, for example, momentarily limiting the production or even rendering the unit unstable during the transition), the change of operating point is a sub-optimal solution and this solution is rejected during the operation b2).

In another example, the operating point estimated in the step b) may be situated in an operating region that is "prohibited" (for reasons of safety, of energy consumption in producing, or other). Such a solution is then filtered during the operation b2). Thus, the validity test of the operation b2) can advantageously be conducted also according to at least one criterion based on trade rules for operating equipment that the unit includes. For example, it is generally sub-optimal to shut down an equipment item too quickly after it is started up (such as a compressor for example). This is also a trade rule which can be taken into account to test the validity of the solution presented in the operation b1).

In yet another example, an overall process for modifying operation of the unit may be in progress and it may be sub-optimal to modify the operating point before the end of this process. Thus, the validity test of the operation b2) can advantageously be conducted also according to at least one criterion based on an analysis of an overall process for modifying current operation of the unit, with a study of the optimality of a modification of the operating point defined in the step b) according to this overall process.

Advantageously, the collection step a) also comprises the collection of constraint data to be observed for the computation of the parameter or parameters defining the new operating point, and the estimation of the optimum solution then takes account of these constraints. It then, here, may be a question of specifying certain rules that the optimization must take into account, in addition to the usual trade rules, as indicated previously.

Advantageously, the method also comprises a pre-processing of the data collected in step a) to simplify a formulation of the demand to be processed during the estimation operation b1).

For example, this pre-processing may comprise notably a scheduling of a long-term task, as successive short-term sub-tasks. This long-term task may, for example, entail the abovementioned overall modification process. Thus, there emerges a possible cooperation between the abovementioned pre-processing and the operation b2) testing the optimum solution presented. In practice, the pre-processing may define different successive operating points to reach an overall target (therefore according to a scheduling of a long-term task as a succession of short-term sub-tasks), whereas the test operation b2) may finally consist of an optimization post-processing notably ensuring that the operating point presented after optimization (in step b1)) is indeed compatible with the overall current modification process.

In such an embodiment, the steps a) and b) can be applied repetitively, and the long-term task is conducted by successive iterations of applications of the steps a) and b) to progressively perform each of said short-term sub-tasks. It will then be understood that it is a closed-loop iterative method to reach, for example, a long-term target setpoint, these iterations being conducted, for their part, in the short term. In reality, this "short term" is defined by the rate of admission of valid solutions in the operation b2). Thus, the abovementioned post-processing sets the rate of optimization of the operation of the production unit.

Obviously, the abovementioned pre-processing can make it possible to simplify the demand according to other criteria. For example, this simplification may also comprise a smoothing of measurement values obtained from the production unit and/or a framing of values in predetermined intervals. More specific examples will be detailed below.

Advantageously, the method also comprises an operation b3) of formatting a set of control setpoints of the unit, this set of setpoints being dependent on the valid optimum solution, retained on completion of the operation b2).

In this context, a multi-variable predictive control (or MVPC) can advantageously be applied.

The post-processing and/or the pre-processing and/or the optimization itself can be conducted by computer modules judiciously programmed to execute test and decision-making instructions, as will be seen later in the description detailed hereinbelow, notably with reference to FIG. 5. Thus, the invention can be implemented by virtue of the execution of a computer program for the post-processing and/or the pre-processing and/or the optimization.

To this end, the present invention targets such a computer program, comprising in particular instructions for implementing the above method, when this program is executed by a processor.

The present invention also targets a device comprising computer means for assisting in the optimization of the management of one or more units producing at least one fluid by co-production of fluids, notably by fluid separation treatment. In particular, such a device comprises at least one post-processing interface for implementing the operation b2) of the above method. Such a post-processing interface may take the form of a computer module downstream of an optimization module, as will be seen with reference to FIG. 1 in an exemplary embodiment described hereinbelow.

Such a device may also comprise a pre-processing interface for simplifying the formulation of demand, as indicated previously.

According to one object of the invention, there is provided a separation apparatus based on distillation of at least one fluid by co-production of fluids, the management of which is optimized by the method of one of claims 1 to 11.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 2 illustrates a user interface screen making it possible to define different production targets over a week, in the example represented;

FIG. 3 represents the load variations with and without the post-processing interface 13 of FIG. 1 (respectively the dotted line curve and the solid line curve);

DETAILED DESCRIPTION

Embodiments of the invention can be implemented within the framework of a combination of a controller, for example of MVPC (multi-variable predictive control) type, with an optimizer (linear or not), for optimum management of production setpoints.

More particularly, the invention proposes a device that combines, but while retaining a separation of their individual function:
an advanced production methods control module (for example of MVPC type), and
and optimization module (linear or not) for optimizing these methods, and the transmission of information from one module to the other is managed by at least one scheduling interface (or "scheduler").

The purpose of such a scheduler is notable to perform a post-processing aiming to accept or reject the solutions of the upstream optimizer, according to the state of the current production method and, thus, allow for a stable behavior of the production system. Another purpose of the scheduler is to transmit the validated targets to the second level, that is to say to the advanced control module.

Advantageously, another scheduler is provided, upstream of the optimizer, to translate and/or transform the constraints of the production system, so as to minimize the number of variables to be processed by the optimizer.

Figure 1:
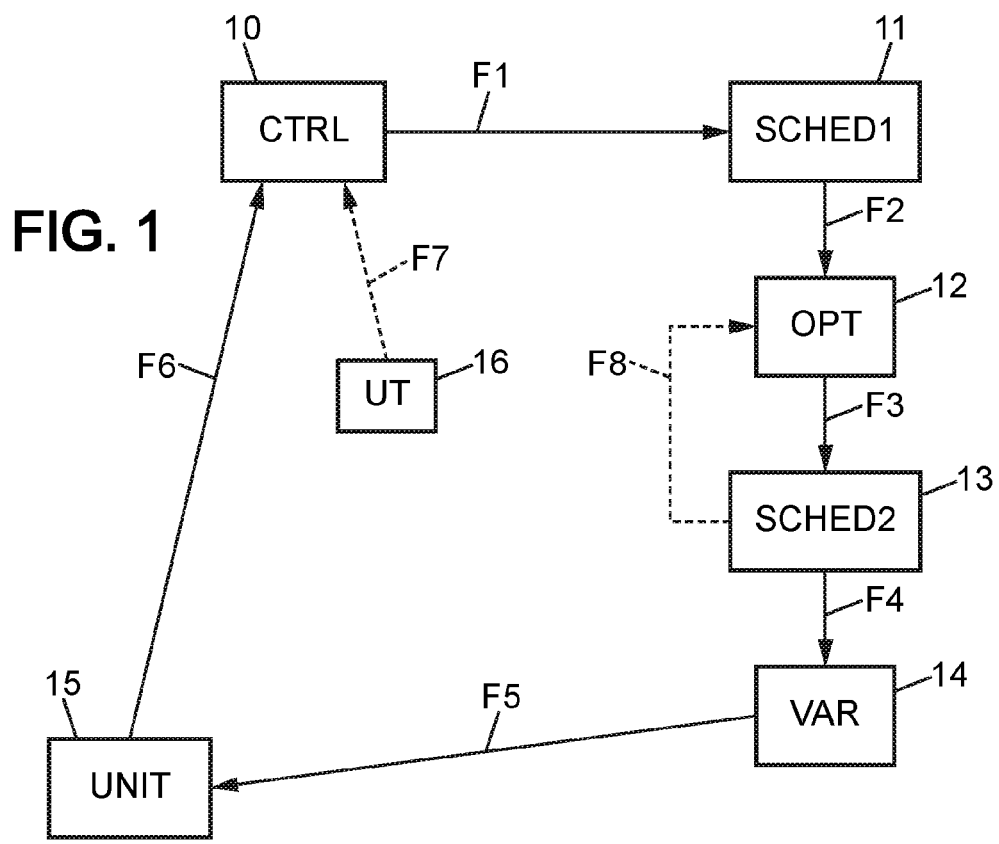
FIG. 1 illustrates the general principle of a multiple-level optimization within the meaning of an embodiment in accordance with the invention.

Thus, referring to FIG. 1 illustrating the different interactions between these elements, a system within the meaning of the invention may comprise, in an exemplary embodiment:
one or more production units 15, based on fluid separation,
a communication module 10 recovering parameters obtained notably from the production units to formulate new production demands according to these parameters and predetermined constraints, specific to the production units for example,
a first, pre-processing, scheduling interface 11, to format these demands notably by simplifying them,
an optimization module 12 for processing these simplified demands by defining in particular a new operating point B, starting from a current operating point A,
a second, post-processing, scheduling interface 13, for filtering the solution or solutions decided by the optimization module and capable of correcting this solution or, in another possible embodiment, of invoking the optimization module to determine a new operating point if the preceding solution is not suitable, for example, for a current operating state of a production unit,
a control module 14, for computing setpoints in order to reach the new operating point B validated by the post-processing interface 13,
possibly, a user station 16 for specifying, for example, constraints or demands to the communication module 10.

In operation, the communication module 10 receives, from one or more production units 15 (arrow F6), a current production status report, in the form of data for example:
of the demand in terms of gaseous oxygen,
in terms of gaseous nitrogen,
in terms of liquid oxygen or other liquids,
of the pressure in the pipelines,
of the compressor limits,
of the limits in terms of consumed power,
or other.

The communication module 10 can also receive (dotted line arrow F7) additional target point and/or scheduling setpoints that a physical user demands from the station 16.

All these data are then communicated (arrow F1) to the pre-processing interface 11 which then defines, according to these collected data, real production values, constraints and target values to be reached starting from the real values and by taking into account these constraints. The interface 11 then transmits the data of these real values, of the target values and of the constraints, to the optimization module 12 (arrow F2). The task of the optimization module 12 is to resolve the problem consisting in reaching the abovementioned target values by defining a new operating point B. Advantageously here, the interface 11 simplifies the position of this problem. Examples of simplification are described below. Thus, this interface 11 can act as filter for the data obtained from the communication module 10 before being presented to the optimization module 12.

The optimization module 12 interprets the filtered data in relation to the current status of the production unit 15 and determines an optimum solution according to at least one chosen criterion. Examples of criteria are given below.

Advantageously, a second scheduling interface 13 filters the solution, in post-processing, determined by the optimization module 12 (arrow F3). Thus, for example, if the new operating point determined by the optimization module 12 is too close to a current operating point, but requiring a sub-optimal operating transition (risking, for example, momentarily limiting the production or even rendering the unit 15 unstable during the transition), the change of operating point is a sub-optimal solution. The post-processing interface 13 then acts as filter to reject this solution. In another simple example, another process modification may be in progress and it is sub-optimal to modify the operating point before the end of the complete modification of the abovementioned process. In yet another example, the operating point estimated by the optimization module 12 may be situated in an operating region that is "prohibited" (for reasons of safety, of energy consumption for producing, or other). The post-processing interface 13 filters this solution. In an exemplary embodiment, the interface 13 can directly correct the abovementioned solution or, as a variant, once again invoke the optimization module 12 to search for a new solution corresponding to a new operating point (arrow F8).

The data concerning the new operating point B are then subsequently transmitted (arrow F4) to the control module 14 which computes operating setpoints of the unit 15 to reach the operating point B. This control module 14 may implement, for example, a technique of MVPC (multi-variable predictive control) type to define an effective change of operating variables. Finally, these setpoints are transmitted to the production members of the unit 15 (arrow F5).

In one embodiment, the simplification of a demand, implemented by the pre-processing interface 11, may comprise, for example, a scheduling of a long-term task (for example over 24 hours, as will be seen later with reference to FIG. 2). To this end the pre-processing interface may subdivide, for example, this task into a succession of subtasks that the production unit must accomplish consecutively to fulfill the scheduled main task.

For example, if a pressure demand of X bar is demanded on a pipeline in 24 hours, the pre-processing interface determines, from a current pressure of $X'_0$ bar on this same pipeline (with $X'_0$ less than X for example), that a production must be increased to obtain $X'_1$ bar on this pipeline (with $X'_0 < X'_1 < X$) in a first stage, then increased to $X'_2$ bar in a second stage (with $X'_0 < X'_1 < X'_2 < X$), and so on.

The optimization module 12 determines, also in a first stage, the new operating point of the production unit making it possible to reach the $X'_1$ bar in the pipeline and the post-processing interface 13 validates or corrects this solution, notably according to predetermined trade rules. The setpoints making it possible to reach this new operating point are formulated by the module 14, and the unit 15 applies these setpoints.

In the abovementioned second stage, depending on the current state of production and notably on the current pressure in the pipeline, the pre-processing interface 11 invokes the optimization module 12 to define a new operating point that makes it possible to reach the pressure of $X'_2$ bar. The post-processing interface 13 validates or corrects this solution according to the abovementioned trade rules. For example, if, to reach the preceding pressure $X'_1$, it has been necessary to start up an equipment item of the production unit (a compressor or other), whereas the reaching of the $X'_2$ bar means that this equipment item should be stopped (for example according to a consumed energy saving or other criterion), the post-processing interface 13 can invalidate the solution consisting in stopping the equipment item because it would be sub-optimal to shut down an equipment item immediately after it is started up. The solution that the post-processing interface will then retain may then consist of a time delay before the shutdown of the equipment item (for example, pending a new target pressure value to be reached $X'_3$).

It will then be understood that the scheduling interface 13, by post-processing, notably makes it possible to "smooth" the operation of the unit 15 by avoiding erratic behaviors, as will be seen in an exemplary embodiment described later with reference to FIG. 3.

It is therefore a closed-loop process (with feedback), iteratively establishing a difference of operating points relative to long-term target setpoints.

The advantages obtained are then multiple.

It is possible to compute an optimum working point relative to a current and real point (on feedback from the method).

The model, even if it is initially imprecise, can be realigned, its errors being able to be smoothed out ultimately, by virtue of the feedback.

The intervention of the scheduler is not subject to a fixed time interval, as in the sense of U.S. Pat. No. 7,092,893 providing a strict time interval to be observed. In practice, a new optimum is taken into account only if the method for adapting to a new setpoint, for example for a change of load, is in a stable state. Typically, the need to determine a new operating point to be reached if a current (but transient) external disturbance is detected (for example, the change of purifying bottles at the head, a change of load previously unfinished, a method not yet stabilized following the last change of load performed, or even a new operating point too close to the current point) is avoided. The list of reasons is not exhaustive, but is representative here of different possible cases.

The scheduling (interfaces 11, 13) allows for a behavior that is therefore more stable and avoids continuous and untimely changes which would be linked, for example, to variations of flow rates (such as the gaseous oxygen production flow rate), and does so notably for simple purity control reasons.

The scheduling makes it possible to minimize the time interval between two optimizations while having feedback on the current status of the production unit on the control and/or optimization.

Advantageously, it is also possible to define minimum running times for the equipment items to avoid having them switched on/switched off in an untimely manner.

The communication module 10 may physically comprise a communication interface with the unit 15 to receive, for example, data on pressures in a distribution network (gaseous oxygen or gaseous nitrogen, for example), liquid levels (production of liquid oxygen and/or addition of liquid in the so-called "liquid assist" column), or other, as well as a communication interface with the user station 16 to receive details of constraints or controls. The communication module 10 may also comprise a computer module (judiciously programmed processor and memory assembly) executing computer programmes (comprising instruction codes for this purpose) for example to format these data according to a chosen communication protocol, to transmit these data to the pre-processing interface 11. With reference FIG. 4, the computer instructions of such a module 10 can be executed from a control station PC1 linked to the production unit 15.

Typically, the scheduling interfaces 11 and 13, like the optimization module 12, can take the form of computer modules (assemblies of judiciously programmed processors and memories) executing computer programmes (comprising instruction codes for this purpose). The computer instructions of the scheduling interfaces 11 and 13 can be executed, for example, from a so-called "DCS" (digital control system) computer unit.

The computer instructions of the optimization module 12 can be executed, for their part, from a personal computer PC2 communicating with the DCS system via an OPC (standard communication protocol) interface, or any other type of protocol which can ensure the correct transfer of data. Similarly, the module for computing the variables 14 can be incorporated in the DCS system.

This is obviously one possible exemplary embodiment. As a variant, the optimization module could also be located in one and the same DCS system or on another machine capable of handling such tasks.

The computer instructions of the optimization module 12 and of the scheduling interfaces 11 and 13 in particular, may be presented, as will be seen later, by computation instructions for:

testing variables (for example by conducting comparisons of fluid pressure and/or flow rate values between a current state of the unit 15 and a forecast future state of the unit), and take decisions on the basis of such tests, by applying trade rules (examples of which are given below).

Furthermore, the overall optimization is in "closed loop" (feedback) mode, therefore in relative mode (or in "derivative" mode), in as much as a new optimum operating point is computed relative to the current state of the production unit, to decide whether a spot modification of operation is necessary or not.

Below is a description, by way of example, of an implementation of the above in the management of the pressures of the oxygen and nitrogen ($O_2$—$N_2$) distribution networks, as well as their liquid productions.

A plurality of production units are considered (production of gases and liquids), as well as a network of pipelines for distribution to the final consumer.

The aim is to determine the load of units (air flow rate, addition of liquid or "addition of liquid" either of liquid oxygen and/or of liquid nitrogen, load liquefier(s)) to satisfy the demands, which are preferentially hierarchically ranked, of the central coordination of the networks, while satisfying a set of constraints. These demands are then formulated by the communication module 10.

The module 10 can in fact formulate general demands, in the context of a central coordination, as follows.

Pressures on the distribution networks (nitrogen and oxygen) are desired with a time horizon of 24 hours, with, in the example described here, two pressure setpoint points per product and per day with an independent time target.

A program established for shutting down and starting up a liquefier (oxygen or nitrogen) must be observed over a week.

A liquid production of oxygen and/or of nitrogen is desired.

Possibly, a maximum electrical power must not be exceeded.

Among the possible particular constraints, account must be taken:

of a given number of compressors in service, of the capacities of the compressors in service (maximum and minimum), of the capacities of the liquid addition pumps (minimum and maximum), of the respective liquid oxygen and liquid nitrogen storage levels, of an operating region that is prohibited, notably for an addition of liquid, when the liquefier is in service (by defining, for example, a limitation on the production of the liquefier per hour), in case of insufficiency of production demand, a predetermined choice of a compressor to be made to operate in closed loop (with recycling from the output of the compressor to its input) so as not to have the compressor operate below a critical threshold, which could compromise its safety.

The control variables may be of the type:

the air flow (via one or more control valves for example), a given liquid addition flow rate and the choice of type of liquid addition (for liquid oxygen and/or liquid nitrogen), and a switching on/off of the liquefier with a maximum and/or minimum load thereof.

All of the abovementioned demands can be displayed on an interface screen as represented in FIG. 2, here over a horizon of one week. The liquefaction demand can be defined by the set of "CYCLE" commands, for example in off-peak hours (HC) or in peak hours (HP), with start or stop conditions based on chosen thresholds. The demands in terms of pressure of gaseous nitrogen (NG) and of gaseous oxygen (OG) in the distribution networks can also be followed. It is also possible to impose a constraint to be observed as a priority ("priority on limit"): in the example represented, the criterion is to observe the oxygen pressure OG. It is also possible to demand a desired liquid addition ("BIB desired").

These demands are then processed by the first scheduling interface 11 (pre-processing of the data before optimization by the module 12), both to transform some of them and so as to minimize the number of variables of the problem to be optimized.

For example:

the pressure objectives are transformed into production targets (gaseous oxygen or gaseous nitrogen) by a preliminary computation based on a current pressure, a pressure to be reached at a chosen instant, a current injection of air, as well as a pressure gradient observed on the distribution network, the targets are selected according to the minimum/maximum capacities of the compressors: for example, if the gaseous oxygen production target is below the minimum flow rate of the oxygen compressors, the minimum flow rate is selected, the measurement data are filtered (smoothed) so as to avoid an instantaneous reaction, the liquid production target is activated or deactivated according to the demand specified by the communication module 10: the deactivation amounts to demanding that the optimization module minimize the air load, the liquid addition and/or liquid production capacities can be limited according to the storage levels, the penalties of the constraints, for example, can be changed to favor one of the gaseous oxygen or gaseous nitrogen productions according to the choice of compressor for which a closed loop ("recycling" mentioned above) mode of operation is accepted.

These transformed variables, as well as the constraints on the control variables and the real state of the unit 15 and/or of optimization already in progress, are transferred to the optimization module 12.

The rate of transfer of the information as well as the rate of computation of the optimization module can be set arbitrarily. In any case, the putting in place of the solutions obtained, and, de facto, the rate of the decisions taken, is determined in particular by the second scheduling interface 13.

In practice, the latter 13 has a number of functions. Several examples are given below.

It ensures that the solutions computed by the optimization module 12 are valid and can be put in service: if, for example, a change of load is already in progress or an operational disturbance is likely to occur (for example, a change of head purifying bottles, or other), or the defined operation would not be sufficiently stable, or even the new operating point is not sufficiently distant from the current point (in the so-called "dead" band), the solutions are disregarded. It can stipulate that the type of liquid addition be changed if the solution decided upon requires it and initiate the startup of ad-hoc equipment (typically, setting the pumps to cold mode).

If the solution supplied by the optimization module is in a prohibited zone, it corrects this solution toward the closest limit.

It sends the operating point change commands to the different systems managing the load of the cryostatic part of the unit 15 (or "cold box") and the load of the liquefier.

Finally, it ensures that the communications proceed correctly, notably between the DCS system and the optimization module (for example, by stopping the real-time optimization and by disconnecting the optimization module, in the event of an incident or loss of communication).

The invention thus makes it possible to manage, in an optimal and hierarchically organized manner, the central coordination demands from the communication module 10. Independently of the situation of the distribution networks, the optimization adapts its control variables optimally and within the constraints specified to satisfy the demands both for gas and for liquids (for example by setting a priority for the gas) while at the same time minimizing the emissions.

The objective is to reach a given pressure at a given moment (temporal notion) while as far as is possible achieving the liquid production target set.

FIG. 3 shows the benefit of the two-level scheduling interfaces to make it possible to apply the solutions resulting from the optimization module in "closed loop" mode, while retaining a stable behavior of the production unit. The solid line curve represents the solutions given by the two-level optimization within the meaning of the invention, whereas the dotted line curve represents the solutions formatted and possibly filtered by the scheduling interfaces. It can be seen that, in the absence of such two-level scheduling, and in particular of the filtering by the post-processing interface 13, the determination of an optimum solution obtained only from the optimization module 12 (solid line curve) would exhibit an erratic behavior (very frequent and useless, even hazardous, load increases and reductions).

Figure 5:
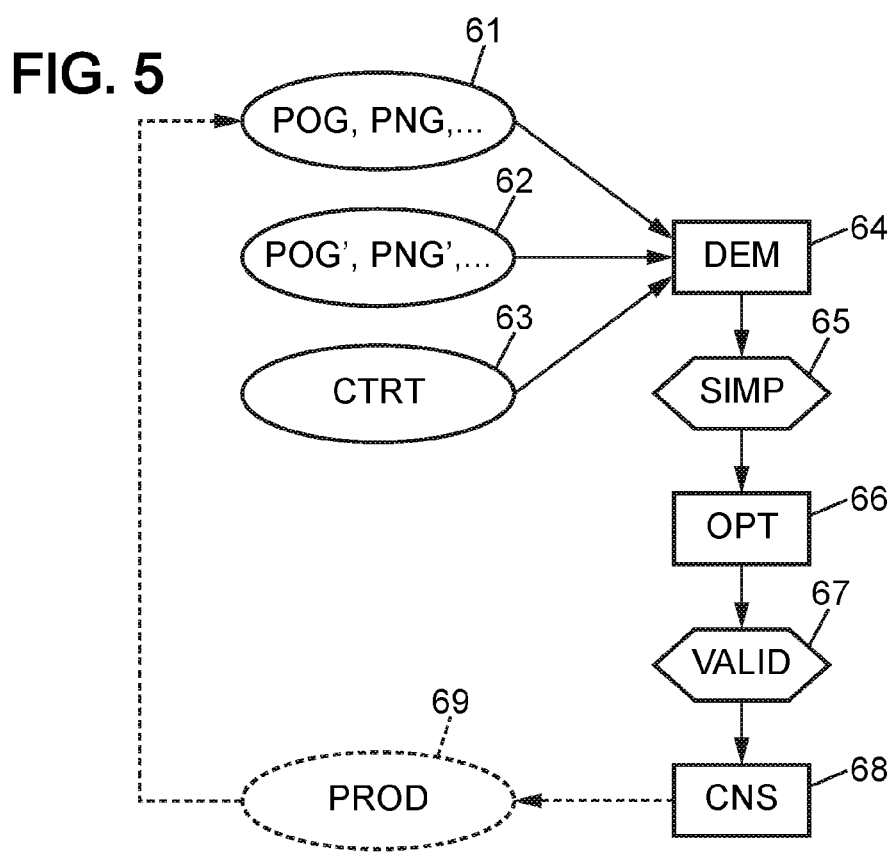
FIG. 5 illustrates a flow diagram representing the possible general algorithm of a computer program within the meaning of the invention, which can be distributed, in an exemplary embodiment, among a plurality of modules 10, 11, 12, 13 and 14 of FIG. 1.

FIG. 5 represents a summary of the steps implemented in an exemplary embodiment within the meaning of the invention. In the step 61, parameters specific to the current operation of a production unit 15 (such as, for example, current oxygen POG, nitrogen PNG, or other pressure values) are obtained from the production unit 15. In the step 62, desired values of these parameters POG', PNG' are determined according to scheduled demands of the distribution network (as described above with reference to FIG. 2), or other. In step 63, constraints CTRT for reaching these desired values are recalled. They may be data stored previously in memory and loaded to be communicated to the optimization module 12. For example, if an oxygen liquefaction is stipulated in the new parameter values in the step 62, the constraint on a moment of operation of the liquefiers (off-peak hours, for example) is loaded in the step 63.

These operations are implemented by the communication module 10 in order to then formulate an overall demand in the step 64 in the form of a problem to have resolved by the optimization module 12. In the step 65, the pre-processing interface 11 checks whether a simplification of this problem can be conducted and, if necessary, performs this simplification (smoothing of the measurement data, corrections of the target setpoints within predetermined value ranges, redefinition of long-term target setpoints as short-term target setpoints, etc.).

On the basis of the demand simplified in the step 65, an optimum solution is determined in the step 66, defining a scheduling of the tasks to be accomplished to reach an optimum operating point. For example, it may involve delaying the production of gaseous oxygen during the off-peak hours to favor the production of liquid oxygen during these hours if priority is granted to consumed energy saving and not to the production of gaseous oxygen. However, for a scheduling of tasks over 24 hours, the quantity of gaseous oxygen produced may satisfy the overall demand formulated in the step 64. Once again, this is only a simple example used for didactic purposes, the production of gaseous oxygen possibly being dependent on many other parameters. In reality, a number of solutions can be proposed in the step 66 and the most valid is retained in the test step 67, for example on the criterion of the most stable possible operation of the various equipment items of the unit 15, to switch from a current operating point A to the new operating point B proposed by the optimization conducted in the step 66.

In the step 68, the optimized (step 66) and filtered (step 67) solution is interpreted to define setpoints corresponding to this solution. This may involve a multi-variable predictive control (MVPC) processing in order to format the setpoint data according to the optimum solution retained. These setpoint data are, for example, new flow rate values imposed on the production unit 15 (step 69) to reach the new operating point B. It will be observed once again in FIG. 5 that the iterative process is in closed loop mode.

Obviously, the present invention is not limited to the embodiment described above by way of example; it applies to other variants.

Figure 4:
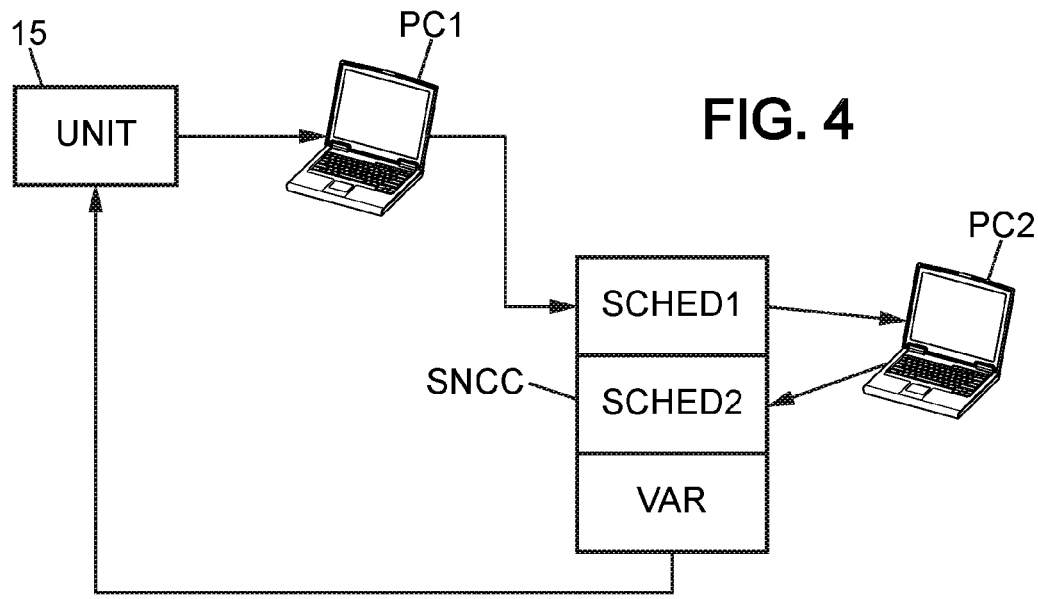
FIG. 4 schematically illustrates a possible exemplary hardware architecture of the modules of FIG. 1.

Thus, the computer architecture represented in FIG. 4 is represented hereinabove only by way of example.

Furthermore, generally, the production by separation of air is described above only by way of example; the invention applies to the production of at least one fluid obtained notably from a fluid separation treatment (notably separating liquid/gaseous phases of different elements in one and the same initial common fluid). The invention applies even more generally to the co-production of fluids, where the term "fluid" is used in the broad sense. For example, the fluid energy represented by electricity can be co-produced with water in steam phase at high pressure in a so-called "cogeneration" method (based on the combustion of a gas). It will then be understood that the invention can also target such a "cogeneration" application given that a constraint on the production of electricity necessarily leads to a constraint on the production of steam, which must involve an optimization.

It will also be noted that the invention is not limited to the optimization of the operation of a production unit to increase the quantity of fluid(s) produced to its maximum. It also aims to ensure the safety of the operating conditions of such a unit.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A computer-implemented method for optimizing the management of at least one production unit producing at least one fluid by co-production of fluids, the method comprising the steps of:
   a) collecting, by operation of at least one computer processor, data, the collected data comprising:
      one or more current parameter values defining a current operating point of one of the at least one production unit,
      a future production demand, and
      at least one optimization criterion;
      simplifying the collected data such that a long-term task of the future production demand is defined as a succession of transitions from the current operating point to a new operating point satisfying the future production demand;
   b) computing, by operation of the computer processor, one or more parameters defining the new operating point of the at least one production unit, at least according to the future production demand, wherein step b) comprises:
      b1) an estimation of at least one optimum solution for the definition of the new operating point, and
      b2) a test of validity of the optimum solution comprising an analysis of each of the succession of transitions of the at least one production unit from the current operating point to the new operating point, wherein the test of validity determines whether each given transition results in a stable operating state for the at least one production unit at that transition; and
   c) directly electronically transmitting the one or more parameters to at least one automatic system to control at least one of a flow rate, a pressure, a temperature, or an equipment run state of the at least one production unit when the validity of the optimum solution is validated to cause the at least one production unit to reach the new operating point via the succession of transitions of the at least one production unit from the current operating point to the new operating point to produce the at least one fluid.

2. The method as claimed in claim 1, wherein the validity test further comprises at least one criterion based on trade rules for operating equipment of the at least one production unit.

3. The method as claimed in claim 1, wherein the validity test further comprises at least one criterion based on an analysis of an overall process for modifying current operation of the at least one production unit, with a study of the optimality of a modification of the operating point defined in the step b) according to the overall process.

4. The method as claimed in claim 1, wherein the collection step a) further comprises the collection of constraint data to be observed for the computation of the parameter or parameters defining the new operating point, and in that the estimation of the optimum solution takes account of the limits.

5. The method as claimed in claim 1, further comprising scheduling a performance of the long-term task as successive short-term sub-tasks required to achieve each successive transition.

6. The method as claimed in claim 5, wherein steps a) and b) are applied repetitively, and in that the long-term task is conducted by successive iterations of applications of the steps a) and b) to perform each of the short-term sub-tasks.

7. The method as claimed in claim 1, further comprising smoothing of measurement values obtained from the at least one production unit and/or a framing of values in predetermined intervals.

8. The method as claimed in claim 1, further comprising the steps of:
   b3) formatting a set of control setpoints of the at least one production unit as the one or more parameters depending on the valid optimum solution.

9. The method as claimed in claim 8, wherein the formatting of the set of control setpoints applies a multivariable predictive control.

10. The method as claimed in claim 1, wherein step b2) sets a rate of optimization of the operation of the at least one production unit.

11. The method as claimed in claim 1, wherein the fluid is selected from the group consisting of gaseous oxygen, liquid oxygen, gaseous nitrogen, liquid nitrogen, and combinations thereof.

12. A computing device, comprising:
   a processor; and
   a memory storing one or more applications executed on the processor to optimize operations of at least a first production unit producing at least one fluid by co-production of fluids, by performing an operation, comprising:
   a) collecting (i) one or more current parameter values defining a current operating point of the first production unit, (ii) data specifying a future production demand, and (iii) at least one optimization criteria; and simplifying the collected data such that a long-term task of the future production demand is defined as a succession of transitions from the current operating point to a new operating point satisfying the future production demand;

b) computing parameters defining the new operating point of the first production unit, at least according to the future production demand, the computed parameters including at least:
   b1) an estimation of at least one optimum solution for the definition of the new operating point; and
   b2) a test of validity of the optimum solution comprising an analysis of each of the succession of transitions of the first production unit from the current operating point to the new operating point, wherein the test of validity determines whether each given transition results in a stable operating state for the first production unit at that transition; and
c) directly electronically transmitting the computed parameters to at least one automatic system to control at least one of a flow rate, a pressure, a temperature, or an equipment run state of the first production unit when the validity of the optimum solution is validated to cause the first production unit to reach the new operating point via the succession of transitions of the first production unit from the current operating point to the new operating point to produce the at least one fluid.

13. A tangible, non-transitory computer-readable medium configured to store instructions executable by a processor of an electronic device, wherein the instructions comprise instructions to:

define a succession of transitions of a production unit from a current operating point of the production unit to a new operating point of the production unit satisfying the future production demand;

compute parameters defining the new operating point of the production unit via:
   an estimation of at least one optimum solution to define the new operating point; and
   a test of validity of the optimum solution comprising an analysis of each of the succession of transitions of the production unit from the current operating point to the new operating point, wherein the test of validity determines whether each given transition results in a stable operating state for the production unit at that transition; and cause the parameters to be directly electronically transmitted to at least one automatic system driving the production unit to control at least one of a flow rate, a pressure, a temperature, or an equipment run state of the production unit when the validity of the optimum solution is validated to cause the production unit to reach the new operating point via the succession of transitions of the production unit from the current operating point to the new operating point to produce at least one fluid.

\* \* \* \* \*